United States Patent
Devaney et al.

(10) Patent No.: US 9,632,534 B1
(45) Date of Patent: Apr. 25, 2017

(54) COVERS FOR WRIST-WORN DEVICES

(71) Applicant: Sol-Light, LLC, Las Vegas, NV (US)

(72) Inventors: William F. Devaney, Boston, MA (US); Phillip Grandinetti, III, Carlsbad, CA (US); David C. Nelson, Las Vegas, NV (US)

(73) Assignee: Sol-Light, LLC., Las Vegas, NV (US)

( * ) Notice: Subject to any disclaimer, the term of this patent is extended or adjusted under 35 U.S.C. 154(b) by 0 days.

(21) Appl. No.: 15/069,064

(22) Filed: Mar. 14, 2016

(51) Int. Cl.
*G06F 1/16* (2006.01)

(52) U.S. Cl.
CPC .................. *G06F 1/163* (2013.01)

(58) Field of Classification Search
CPC ....................................... G06F 1/163
See application file for complete search history.

(56) References Cited

U.S. PATENT DOCUMENTS

| | | | | |
|---|---|---|---|---|
| 3,712,049 A * | 1/1973 | Luxembourg | ......... | G04B 43/00 224/171 |
| 3,888,127 A * | 6/1975 | Shamlian | ............... | G04B 19/30 340/850 |
| 5,848,030 A * | 12/1998 | Sullivan | ............. | G04B 37/1426 368/282 |
| 6,529,754 B2 * | 3/2003 | Kondo | ............... | A61B 5/02438 600/335 |
| 8,534,514 B2 * | 9/2013 | Zhu | ........................... | A45F 5/00 224/152 |
| 9,144,168 B2 * | 9/2015 | Sedillo | ..................... | H05K 7/02 |
| 9,261,231 B2 * | 2/2016 | Bhatia | ..................... | F16M 13/04 |
| 9,313,305 B1 * | 4/2016 | Diebel | .................... | G03B 17/02 |
| 9,329,053 B2 * | 5/2016 | Lakovic | .................. | G04F 10/00 |
| D766,770 S * | 9/2016 | Devaney | ........................ | D11/86 |
| 2014/0054909 A1* | 2/2014 | Kannaka | ................. | A45F 5/102 294/137 |
| 2015/0289615 A1* | 10/2015 | Welsch | .................... | G06F 1/163 224/219 |
| 2016/0128209 A1* | 5/2016 | Yoon | ....................... | G06F 1/163 361/679.01 |
| 2016/0223992 A1* | 8/2016 | Seo | ....................... | A44C 5/0007 |

OTHER PUBLICATIONS

Bytten for Fitbit Charge & Charge HR Matisse 2-Pack—Pearl White & Satin Gold Plastic, Target, http://www.target.com/p/bytten-for-forbit-charge-charge-hr-matisse-2-pack-pearl-white-satin-gold-plastic, 4 sheets, date unknown, but prior to filing.

(Continued)

*Primary Examiner* — Lisa Lea Edmonds
(74) *Attorney, Agent, or Firm* — Banner & Witcoff, Ltd.

(57) ABSTRACT

A cover for a wrist-worn electronic device is provided. The cover includes a housing, a first and a second wrist strap aperture and a display window. The housing is comprised of an elastic material and defines a cavity configured to receive at least a portion of the electronic device and includes a first end and a second end opposite of the first end. The first and second wrist strap apertures are disposed at the respective first and second ends of the housing and are each configured to receive a wrist strap of the electronic device. The display window is disposed on a side of the housing between the first and second ends and is configured to allow visibility of a display of the electronic device when the cover is placed on the electronic device.

20 Claims, 10 Drawing Sheets

(56) References Cited

OTHER PUBLICATIONS

Bytten for Fitbit Charge & Charge HR Chloe—Silver, Target, http://www.target.com/p/bytenn-for-fitbit-charge-charge-hr-chloe-silver, 4 sheets, date unknown, but prior to filing.
Bytten for Fitbit Flex Lucas 2 Pack—Sparkle Silver & Satin Gold Plastic, Target, http://www.target.com/p/byteen-for-fitbit-flex-lucas-2-pack-sparkle-silver-satin-gold-plastic, 4 sheets, date unknown, but prior to filing.
Dandyshell Fit Apple Watch 42 mm Cases, Speck, http://www.speckproducts.com/apple/apple-watch-cases/apple-watch-42mm-cases/candysell-fit-apple-watch-42mm-cases, 3 sheets, date unknown, but prior to filing.
Naked Tough Bumper-Clear, Case-Mate, http://www.case-mate.com/products/clear-apple-watch-38mm-naked-tough-bumper, 2 sheets, date unknown, but prior to filing.
French Bull Designer Band for Garmin Vivofit 2—Vine, WITHit, http://www.withitgear.com/collections/frontpage/products/copy-of-french-bull-designer-band-for-38mm-apple-watch-vine, 10 sheets, date unknown, but prior to filing.
French Bull Designer Band for Misfit Shine—Vine, WITHit, http://withitgear.com/collections/frontpage/products/french-bull-designer-band-for-mistit-shine-vine, 12 sheets, date unknown, but prior to filing.
1 photo of French Bull Designer Band for Gamin, date unknown, but prior to filing.
1 photo of French Bull Designer Band for Misfit Shine, date of photos May 14, 2015.
2 photos of Bytten for Fitbit Charge & Charge HR Matisse, date of photos Dec. 17, 2015.
1 photo of Bytten for Fitbit Charge & Charge HR Chloe, date of picture Dec. 17, 2015.
1 photo of Bytten for Fitbit Charge & Charge HR Chloe accessories, date of picture Dec. 17, 2015.
1 photo of Bytten for Fitbit Charge & Charge HR Lucas and Chloe accessories, date of picture Dec. 17, 2015.

\* cited by examiner

COVERS FOR WRIST-WORN DEVICES

FIELD

Aspects described herein are generally directed to device covers. More particularly, aspects described herein pertain to elastic covers for wrist-worn electronic devices.

BACKGROUND

Wrist-worn electronic devices are capable of providing a wide range of information to a wearer. For instance, certain wrist-worn electronic devices provide personal health monitoring to the user, such as but not limited to monitoring a wearer's heart rate, sleep patterns, steps taken, physical activity statistics, and the like. In some instances, wrist-worn electronic devices may provide similar functionality as a smart phone, e.g., Internet and email access, calendar monitoring, text messaging, phone calls, and the like. Accordingly, to provide such functionality, wrist-worn electronic devices house a variety of electronics and sensors.

Because in many instances, the wrist-worn electronic devices discussed herein are intended to provide frequent or constant monitoring of a wearer's activity, the above-described wrist-worn electronic devices tend to be worn constantly or near constantly throughout the day. Accordingly, there is a need to provide a protective cover to at least a portion of the wrist-worn electronic device, e.g., to protect from against potential damage, including environmental damage and damage from impacts, as well as to provide more aesthetically pleasing features than the device itself, without limiting functionality of the wrist-worn electronic device and/or causing discomfort to the wearer.

SUMMARY

This Summary is provided to introduce some general concepts relating to this invention in a simplified form that are further described below in the Detailed Description. This Summary is not intended to identify key features or essential features of the invention.

Aspects of this disclosure relate to covers for wrist-worn electronic devices. Such covers may be composed of elastic materials and may offer protection from potential damage when placed on a wrist-worn electronic device. In some aspects, a cover for a wrist-worn device may include a housing, first and second wrist strap apertures and a display window. The housing may define a cavity configured to receive at least a portion of the electronic device. The first wrist strap aperture and the second wrist strap aperture may be disposed at opposite longitudinal ends of the housing. The display window may allow visibility of a display of the electronic device when the cover is placed on the electronic device. At least one rear aperture may be disposed on a side of the housing opposite of the display window. The display window and/or the rear aperture may be enclosed on all sides by the housing.

Additional aspects of this disclosure relate to wrist-worn electronic device and device cover assemblies including a wrist-worn electronic device and a device cover. The wrist-worn electronic device may include a pair of wrist straps and a main body having a display portion. For example the wrist-worn device may be an athletic activity monitoring device, a fitness tracker, a smart watch and the like. The protective device cover may be configured to receive the electronic device and may be shaped so as to fit over at least a portion of the electronic device, and may include various apertures, windows, and other features as describes herein.

BRIEF DESCRIPTION OF THE DRAWINGS

A more complete understanding of the aspects and embodiments disclosed herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings. It is to be understood that other embodiments may be utilized and structural and functional modifications may be made without departing from the scope of the invention.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

Figure 1A:
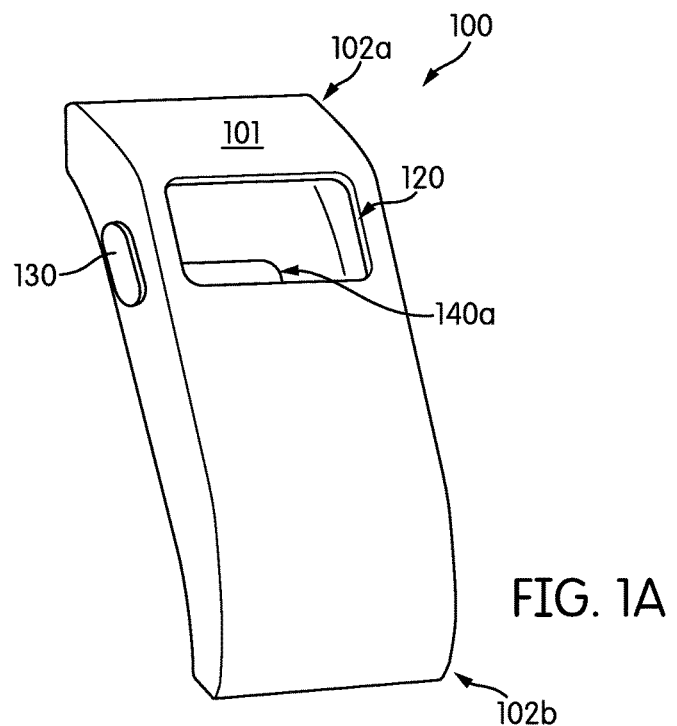
FIG. 1A is a perspective front view of a cover in accordance with one or more aspects of the present disclosure.
Figure 1B:
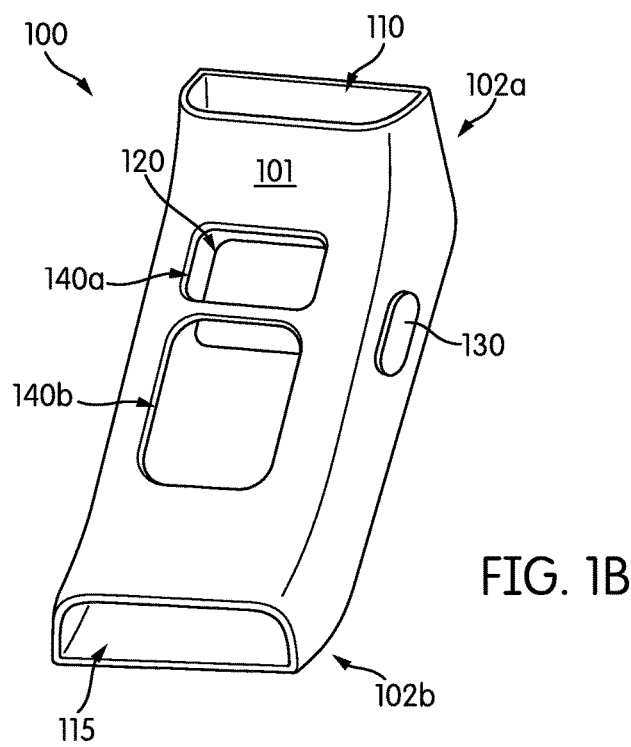
FIG. 1B is a perspective rear view of the cover of FIG. 1A.

FIGS. 1A and 1B are perspective front and rear views respectively of an example device cover 100. The device cover 100 may be employed, in accordance with one or more aspects discussed herein, as a cover for an electronic device, a wrist-worn device, or other similar devices.

In some embodiments, the electronic device may be an athletic activity monitoring device, a fitness tracker, a smart watch, and the like. For example, the device may be an athletic activity monitoring device that monitors heart rate, physical movement, sleep tracking, body temperature, step counting and/or other metrics to provide ongoing monitoring of a user's physical activity. Accordingly, such devices may employ one or more sensors to monitor or measure certain activities. In some examples, sensors may contact a wearer's skin, such as a wrist, a portion of the chest, an ankle, and the like, for obtaining certain measurements. Such electronic devices may have features which utilize the measured and/or monitored activity to output various reports to a user, such as coaching guidelines, personalized workout routines, activity summaries and analysis, and the like. Additionally, such electronic devices may include additional functionalities outside of activity or fitness monitoring, including but not limited to GPS tracking, internet and email access, calendar monitoring, text messaging and phone calls, smartphone pairing, and the like.

The above-described electronic devices often include display portions which provide a user display of various measurements, notifications, and/or settings. Such electronic devices may also include one or more buttons, keypads, dials, or other similar user selection features which allow a user to adjust and/or select various settings of the electronic device.

Device covers as discussed herein may cover portions of such electronic devices and may offer some degree of protection of the electronic device from, e.g., environmental damages, wear and tear, impact forces, and other potential damage to which such devices might be susceptible. Further, device covers may employ various features which allow the device cover to be placed over the electronic device without impeding various capabilities and functions of the device itself.

As shown in FIGS. 1A and 1B, the device cover 100 may include a main body or housing 101 having a first end 102a and a second end 102b opposite of the first end 102a. For example, a wrist-worn device may include a pair of wrist straps which extend from a main portion of the wrist-worn device longitudinally in opposite directions. In one or more aspects, first and second ends 102a, 102b are disposed at opposite longitudinal ends of housing 101 such that first and second ends 102a, 102b extend in generally the same direction as the wrist straps from the main portion of the wrist-worn device. Housing 101 may extend laterally along the first and second ends 102a, 102b, e.g., generally corresponding to a width of a wrist-worn device. Housing 101 may extend in a direction perpendicular to the longitudinal and lateral directions generally corresponding to a thickness of the wrist-worn device. Housing 101 may define a cavity between the first and second ends 102a and 120b, the cavity configured to receive and house a least a portion of a wrist-worn electronic device. In some examples the cavity defined by housing 101 may be on the order of 0.25 to 2.5 inches long, 0.25 to 1.5 inches wide, and 0.05 to 0.5 inches thick. In certain examples the cavity defined by housing 101 may be on the order of 0.75 to 1.25 inches long, 0.5 to 1.0 inches wide, and 0.1 to 0.3 inches thick. Still in other examples, the cavity may have dimensions smaller or larger than the above-referenced dimensions without departing from the scope of the present disclosure.

A first wrist strap aperture 110 may be disposed at the first end 102a of housing 101. Similarly, a second end aperture or wrist strap aperture 115 may be disposed at the second end 102b of housing 101. The first wrist strap aperture 110 and the second wrist strap aperture 115 may each be configured to receive and cover at least a portion of a wrist strap of the electronic device. Accordingly, the first wrist strap aperture 110 and the second wrist strap aperture 115 may each be sized and shaped as appropriate to fit around wrist straps of an electronic device. The first wrist strap aperture 110 and the second wrist strap aperture 115 may have similar length, width and/or thickness dimensions. In some examples the first wrist strap aperture 110 and the second wrist strap aperture 115 may have a length between 0.2 and 1.0 inches and a width between 0.05 and 0.2 inches. Still in other examples, the first wrist strap aperture 110 and/or the second wrist strap aperture 115 may have dimensions smaller or larger than the above-referenced dimensions without departing from the scope of the present disclosure.

In some examples, first and second wrist strap apertures 110, 115 may be sized to fit flush with wrist straps of a device. Still in other examples, first and second wrist strap apertures 110, 115 may be sized larger than the wrist straps of a device or may be sized slightly smaller than the wrist straps but configured to stretch over the wrist straps of a device. In examples where first and second wrist strap apertures 110, 115 have a smaller thickness than a middle portion of housing 101, first and second wrist strap apertures 110, 115 may secure or assist in securing cover 100 in place on a wrist-worn device. In some examples, first and second wrist strap apertures 110, 115 may have cross-sectional areas (e.g., cross-sections taken orthogonal to the longitudinal direction of the cover 100) that are smaller than a cross sectional area of a middle portion of housing 101.

In some examples, first wrist strap aperture 110 may have a first thickness (e.g., in a direction corresponding to a thickness of a wrist strap) and second wrist strap aperture 115 may have a second thickness. In one or more aspects, the first thickness and/or the second thickness may be smaller than a third thickness corresponding to a middle portion of housing 101, e.g., between the first and second ends 102a, 102b. With a thickness of the first and/or second wrist strap apertures 110, 115 being smaller than a thickness of a middle portion of housing 101, first and/or second wrist strap apertures 110, 115 may define a cross-sectional area that is smaller than a cross-section area of a main portion of a wrist-worn device. Accordingly, cover 100 may be prevented from sliding longitudinally out of place when positioned on a wrist worn device.

Display window 120 may be disposed on a side of housing 101 between the first end 102a and the second end 102b. For example, display window 120 may be disposed on a front side of housing 101 extending lengthwise and widthwise on housing 101 and may correspond to a front side of a wrist-worn device, e.g., a side having a main display portion. In some examples, display window 120 may be disposed on a side of housing 101 that extends in the longitudinal and lateral direction. Display window 120 may have a length between 0.25 and 0.75 inches and a width between 0.25 and 0.75 inches. Still in other examples, the display window 120 may have dimensions smaller or larger than the above-referenced dimensions without departing from the scope of the present disclosure. Display window 120 may be any number of shaped windows, including but not limited to rectangular, rounded rectangular, circular, semi-circular, and the like. Display window 120 may be configured to allow visibility of a display of the electronic device when the cover is placed on the electronic device. Accordingly, display window 120 may be sized and positioned on housing 101 to substantially align with at least a portion of the display of the electronic device, e.g., such that at least a portion of the display is visible when the cover 100 is placed on an electronic device. Display window 120 may be a cutout portion of housing 101. In some examples, display window may include a transparent A deformable raised protrusion 130 may be disposed on a side of housing 101. Raised protrusion 130 may be sized and positioned on housing 101, such that, when cover 100 is placed on an electronic device, raised protrusion 130 may cover a button of the electronic device. Raised protrusion 130 may have a length between 0.05 and 0.3 inches and a width between 0.05 and 0.3 inches. Still in other examples, the raised protrusion may have dimensions smaller or larger than the above-referenced dimensions without departing from the scope of the present disclosure. Accordingly, in response to a user push action, the raised protrusion 130 may be configured to elastically deform toward the cavity so that the button is pressed when cover 100 is placed on the electronic device. For example, sides which define a height of raised protrusion 130 may have a smaller thickness than other portions of the raised 130 to allow it to elastically deform. As shown in FIGS. 1A and 1B, one deformable raised protrusion is provided on a side of housing 101. In some examples, multiple deformable raised protrusions 130 may be provided on device cover 100 and each of the multiple deformed raised protrusions 130 may be configured to each cover at least one button of an electronic device. Additionally, the one or more deformable raised protrusions 130 may be provided on various sides and areas of housing 101.

Rear apertures 140a, 140b may be disposed on a side of housing 101. As shown in FIGS. 1A and 1B, rear apertures 140a, 140b are disposed on a rear side of housing 101, opposite of the display window 120. At least one of rear apertures 140a, 140b may be configured to allow accessibility to a sensor of the electronic device when the cover 100 is placed on the electronic device. In some embodiments, at least one of the rear apertures 140a, 140b may be configured to allow accessibility to a charging port or charging portion of the electronic device, e.g., such that a charging cable may be plugged into the electronic device while the cover 100 is placed on the electronic device. Accordingly, rear apertures 140a, 140b may each be sized and positioned on housing 101 to substantially align with a sensor and/or a charging port of the electronic device, e.g., such that a sensor may maintain contact with a wearer and/or so that the charging port remains accessible when the cover 100 is placed on an electronic device. For example, aperture 140a may be a charge port aperture and aperture 140b may be a sensor aperture to allow access to a sensor such as a heart rate monitor. Rear apertures 140a, 140b may have a length between 0.25 and 0.75 inches and a width between 0.25 and 0.75 inches. Still in other examples, the rear apertures 140a, 140b may have dimensions smaller or larger than the above-referenced dimensions without departing from the scope of the present disclosure.

The cover may be comprised of a stretchable elastic material. In some embodiments, the cover may be configured to stretch over portions of the electronic device and to fit in place on the electronic device such that the cover fits flush with at least some surfaces of the electronic device. Accordingly, the cover may be comprised of various materials that are stretchable, elastic and/or resilient to an amount of deformation. The cover may be comprised of rubber, silicone, plastic, and the like. In addition to providing protective cushioning and comfort to a wearer, covers of such material may have the additional benefit of providing friction so as to reduce slippage of the cover along the wrist-worn device, as opposed to other materials such as metals. Preventing slippage may be important to maintain proper use of the wrist-worn device (e.g., for viewing a display portion, for maintaining accessibility to a sensor accessible).

Additionally, the elasticity of the device cover may allow it to be stretched and/or pulled without the risk of breaking or bending portions so as to reduce the securement of the device cover on the device. In some embodiments, the cover may be sized so as to fit flush with an electronic device when the cover is placed over the electronic device and portions of the cover may be able to stretch over a main body portion of the electronic device. Portions of the device cover closer to the opposing ends, e.g., portions closer to the wrist strap apertures, may be thinner than other portions of the device cover. In some examples, portions of the deformable raised protrusion may be thinner than other portions of the device cover.

Device covers according to one or more aspects described herein may have additional manufacturing benefits. For instance, device cover may be produced in a one piece construction and may not require assembly of multiple parts. Device covers composed of elastic materials are also more cost effectively produced than certain other materials. In some aspects, device covers may be composed of silicone or other injected elastomers. For example, device covers may be composed of a food grade silicone, which is non-toxic, unlikely to cause an allergic reaction, and able to employ a permanent three-dimensional decorating technique thereon. In some other aspects, device covers may be composed of one or more hard plastics. Additionally, apertures and/or windows on the device covers are more easily provided, e.g., by removal of an area of material on the housing, as opposed to other more inelastic materials, such as metals. In that regard, modifications to features on the device cover, such as various visual elements, may easily be added to such elastic device covers.

Device covers composed of elastic material may be manufactured having greater thickness than more inelastic materials, such as metals. Accordingly, covers according to certain aspects may be thicker and thus provide more protection than covers of more inelastic materials. Further, elastic material such as silicone, rubber and certain plastics may provide additional impact resistance, such as shock absorption, as compared to more inelastic materials.

Figure 2A:
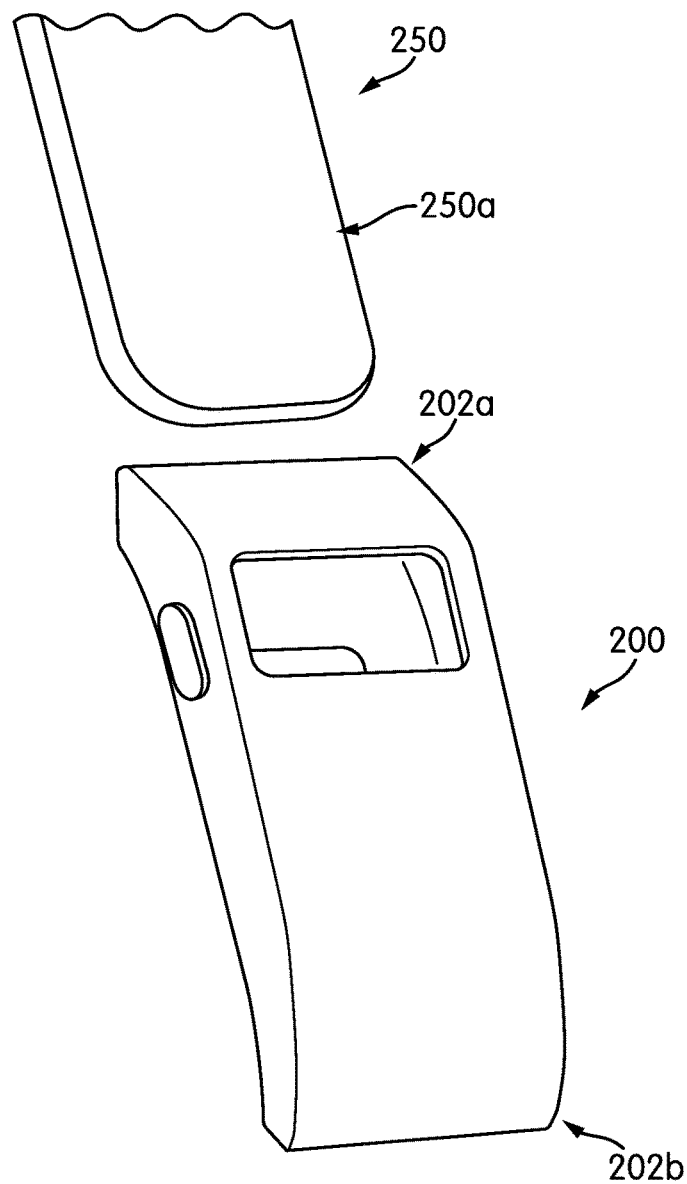
FIGS. 2A-C are schematic views respectively showing a cover separated from a wrist-worn electronic device, the cover being placed over the wrist-worn electronic device, and the cover in place on the wrist-worn electronic device, in accordance with one or more aspects of the present disclosure.
Figure 2B:
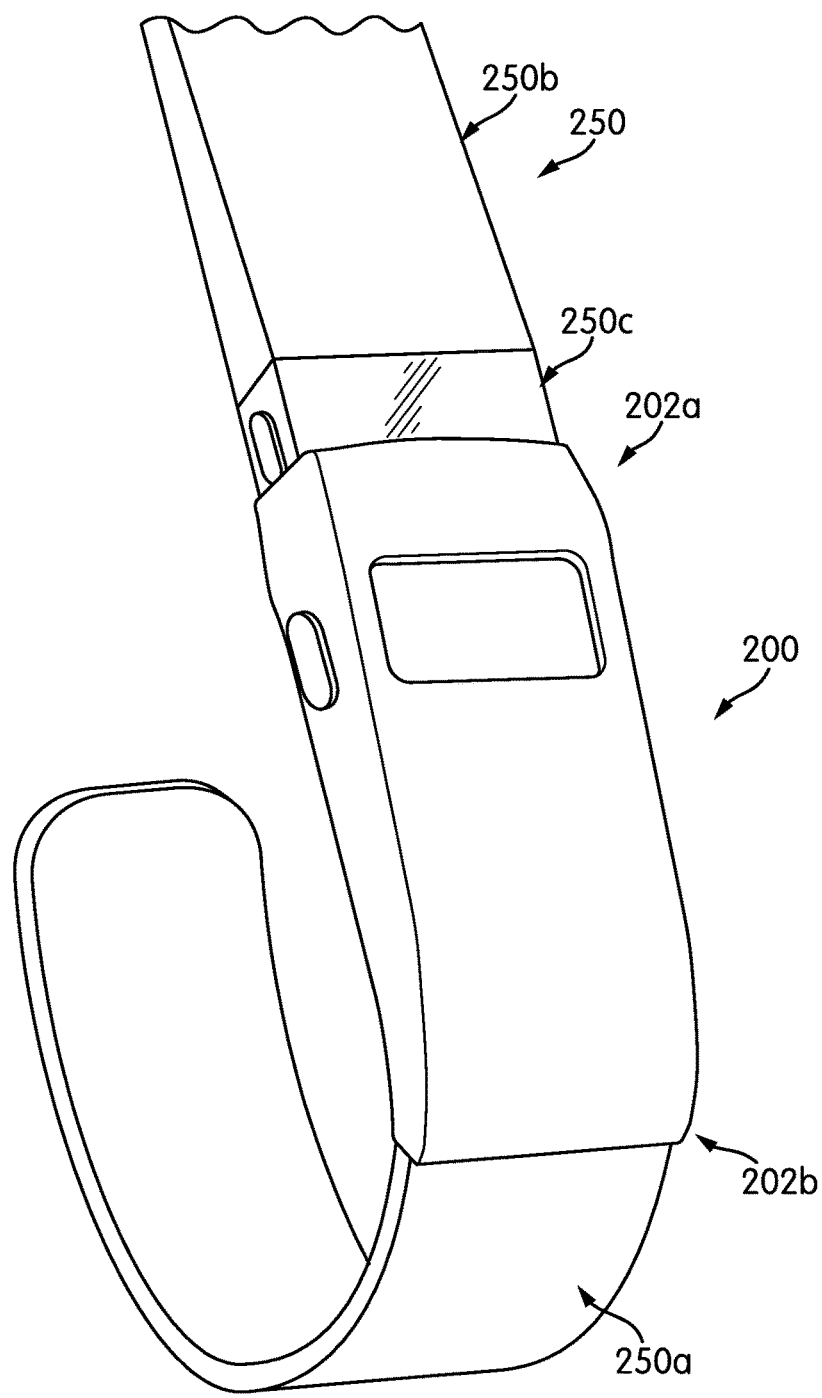
Figure 2C:
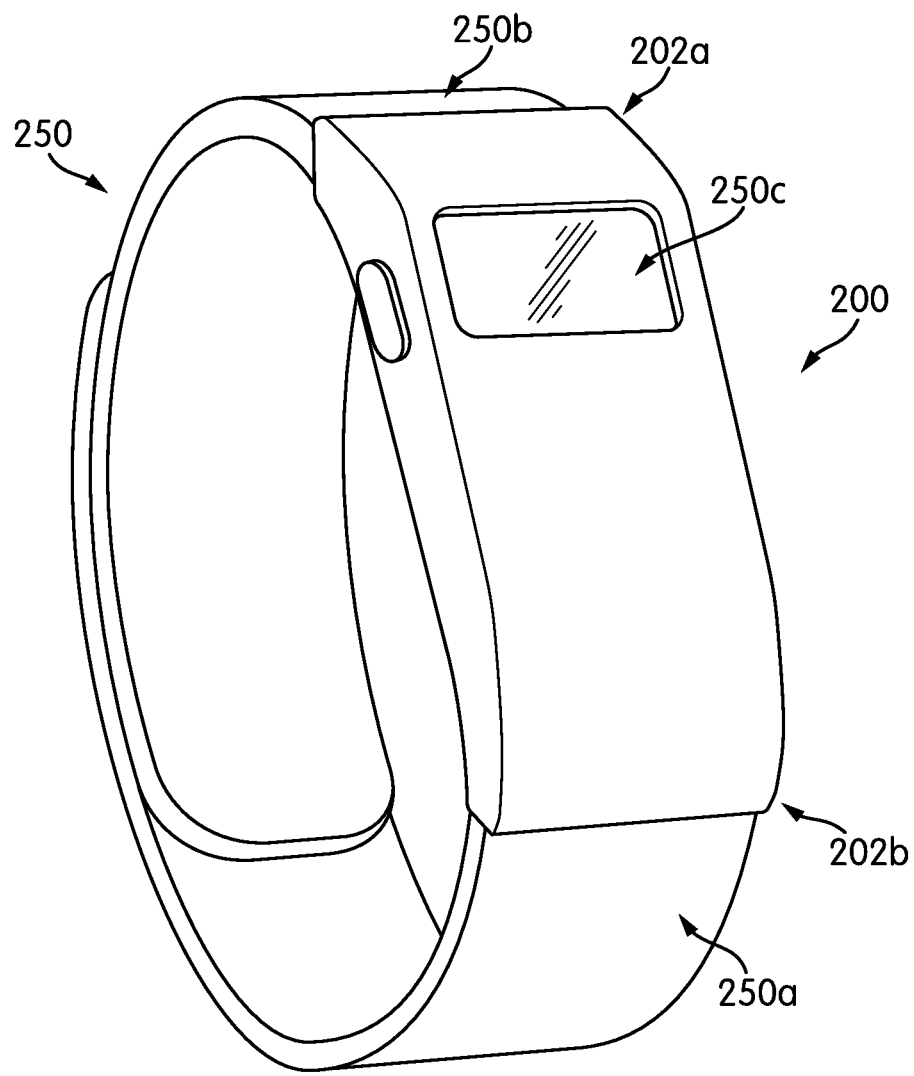

FIGS. 2A-2C depict an embodiment with a cover 200 having the above-described stretchable properties and being placed over an electronic device 250.

In FIG. 2A, while the cover 200 is separated from the electronic device 250, first end 202a of the cover 200, e.g., where the first wrist strap aperture 110 of cover 100 of FIGS. 1A and 1B is located, is located separate from a first wrist strap 250a. Accordingly, a first wrist strap aperture may receive the first wrist strap 250a, which is subsequently fed through an inner cavity of cover 200.

As shown in FIG. 2B, as the electronic device 250 is fed through an inner cavity of the cover 200, a main body portion 250c of the electronic device, e.g., a portion that is wider and/or thicker than the wrist straps 250a, 250b, will be fed through the first aperture at end 202a of cover 200. Accordingly, portions of the cover 200 may stretch over and around the main body portion 250c as the electronic device 250 continues to be fed through cover 200. Additionally, as the electronic device 250 is fed through cover 200, an aperture at the second end 202b (e.g., second wrist strap aperture 115 of FIGS. 1A and 1B), receives first wrist strap 250a.

Electronic device 250 continues to be fed over cover 200, e.g., until cover 200 is in place over main body portion 250c and apertures at ends 202a, 202b each receive one of the wrist straps 250a, 250b, as shown in FIG. 2C. Accordingly, cover 200 may cover at least a portion of main body portion 250c of electronic device 250, while wrist straps 250a, 250b are securable at opposite ends so as to be secured on a wearer's wrist.

Various portions of cover 200 may serve as indicators for whether the cover 200 is in place over the electronic device. For example, a display window may serve as an indicator for cover 200 being in place over electronic device 250. A display window may be sized and positioned on cover 200 to substantially align with a display on main body portion 250c of electronic device 250. Additionally various makes and models of wrist-worn electronic devices may include displays of varying sizes and positions of the electronic device 250, and a display window of cover 200 may be sized and positioned accordingly.

Figure 3:
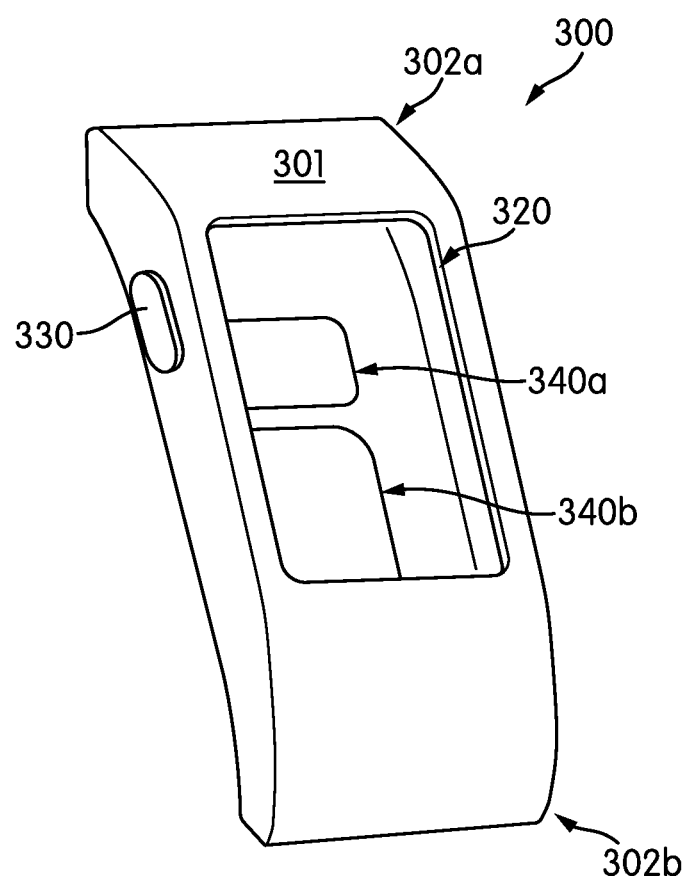
FIG. 3 is a perspective front view of a cover in accordance with one or more aspects of the present disclosure.

As shown in FIG. 3, device cover 300 includes various features similar to cover 100 of FIGS. 1A and 1B, including ends 302a, 302b, deformable raised protrusion 330 and rear apertures 340a, 340b. However, display window 320 is sized larger such that it extends down a larger portion of a front side of housing 301 than display window 120 of FIGS. 1A and 1B. In addition to display window 120 of FIGS. 1A and 1B and display window 320 of FIG. 3, display window in accordance with various other embodiments may be various sized, shaped and positioned on the housing of the cover without departing from the scope of the present disclosure. While a single display window 320 is shown in FIG. 3, multiple display windows may be provided to allow visibility of multiple displays or multiple portions of a single display. Additionally, display windows in accordance with various other embodiments may be sized to allow visibility of only a portion of a display, may be sized to align with the display and only allow visibility of only the display, may be sized larger than the display, or may be sized in other variations relative to the display, without departing from the scope of the present disclosure.

Figure 4:
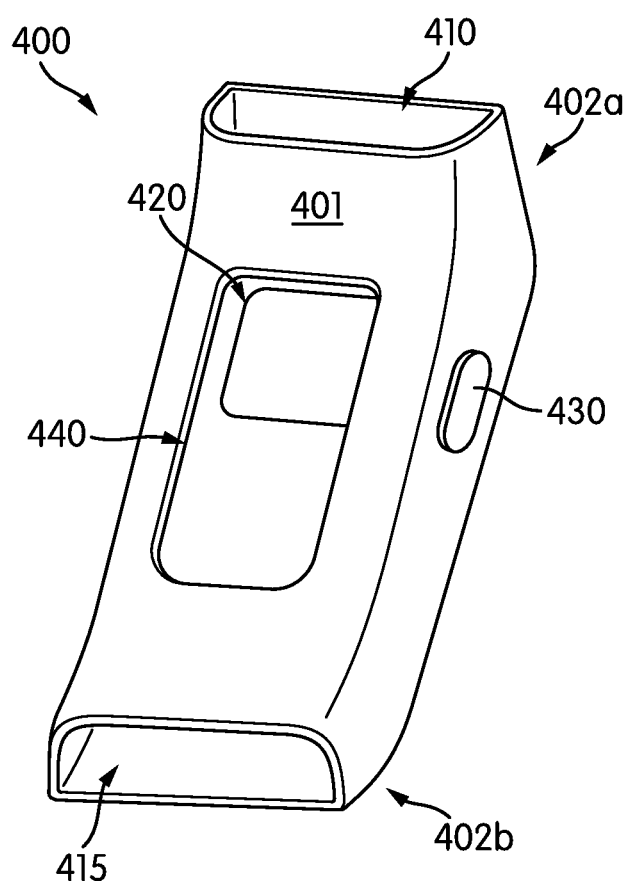
FIG. 4 is a perspective rear view of a cover in accordance with one or more aspects of the present disclosure.
Figure 5:
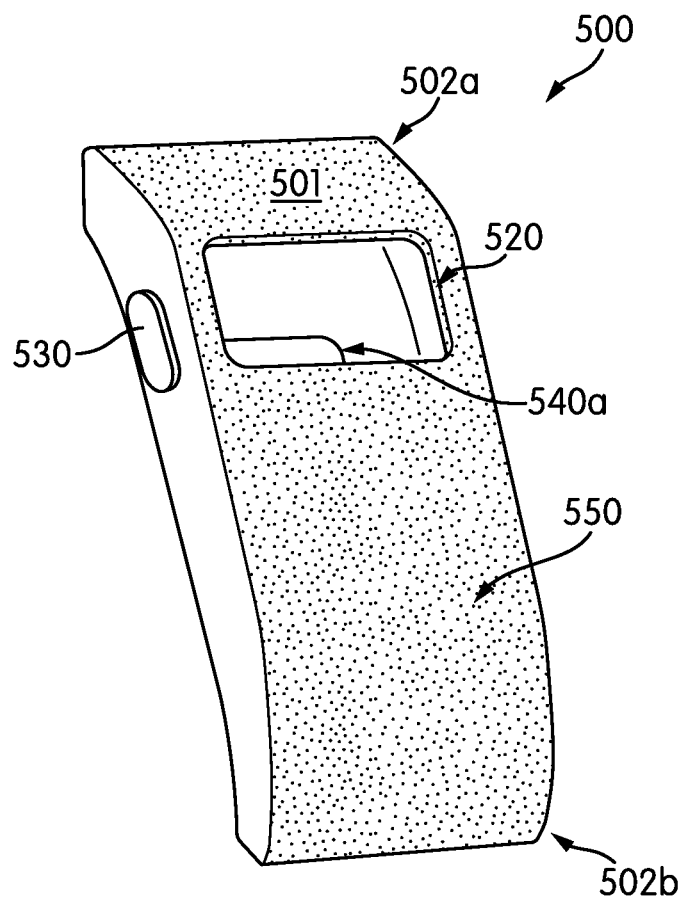
FIG. 5 is a perspective front view of a cover in accordance with one or more aspects of the present disclosure.

In some embodiments, instead of two rear apertures 140a, 140b, a rear side of housing 101 may have a single aperture sized to allow accessibility for a number of sensors and/or charging ports included on an electronic device. For example, as shown in FIG. 4, a single rear aperture 440 is provided on cover 400. Rear aperture 440 may extend over a larger portion of a rear side of housing 401 than rear apertures 140a, 140b of FIGS. 1A and 1B. Cover 400 may otherwise be similar to cover 100 of FIGS. 1A and 1B, and may include housing 401 having opposing ends 402a, 402b, as well as wrist strap apertures 410, 415 at the respective opposing ends 402a, 402b, display window 420, and deformable raised protrusion 430. While rear aperture 440 may be provided in varying sizes, shapes, locations and quantities on rear side of housing 401, apertures may be provided on other areas of housing 401, so as to allow access to a sensor and/or charging port of an electronic device, without departing from the scope of the present disclosure.

Figure 6:
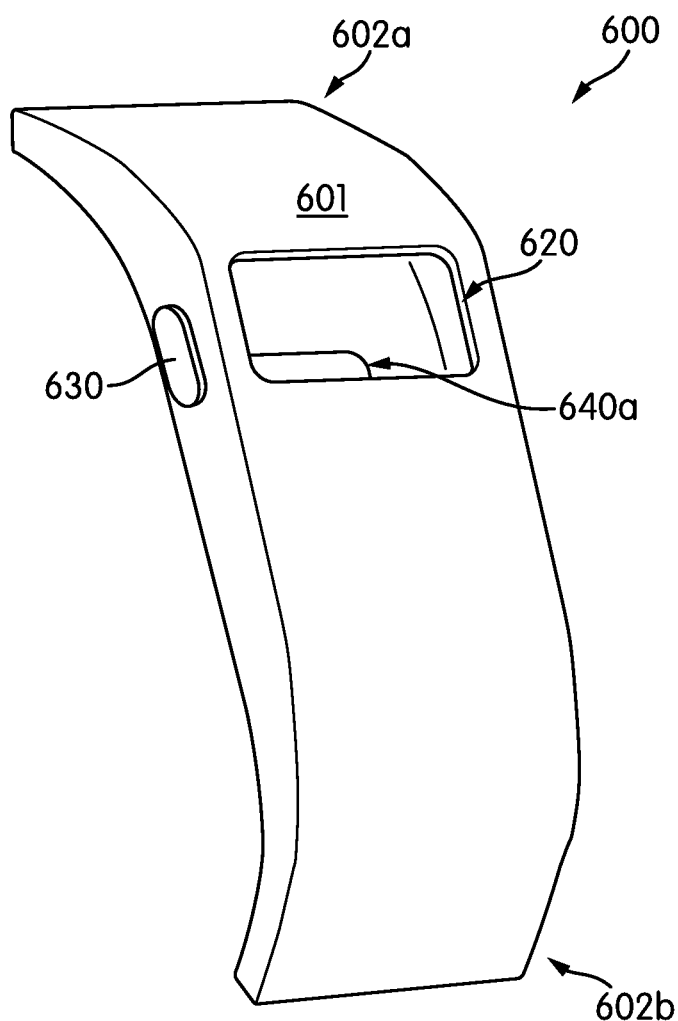
FIG. 6 is a perspective front view of a cover in accordance with one or more aspects of the present disclosure.

In some examples, device cover 500 may include one or more visual element 550 on at least a portion of housing 501, e.g., an exterior portion of housing 501, to assist in alignment of the cover 500 with a wrist-worn electronic device. Similar to cover 100 of FIGS. 1A and 1B, cover 500 may include display window 520, deformable raised protrusion 530 and rear aperture 540a. Visual element 550 may include any number of features including, but not limited to surface designs or ornamentation, a contrast of colors, a contrast of surface finishes, a contrast in materials, a textual or image element, and the like. Visual element 550 may be located on a same side of housing 501 as display window 520. In some embodiments, visual element 550 may extend over an entire side of housing 501, e.g., from a first end 502a to a second end 502b of a front exterior surface. In other embodiments, visual element 550 may extend over more than one side of housing 501. Still in other embodiments, visual element 550 may be disposed on only a portion of housing 501, e.g., less than an entire side In certain embodiments, the cover may be configured to cover various amounts of an electronic device. For example, as shown in FIG. 6, cover 600 may include housing 601 with ends 602a, 602b that may be configured to cover at least a portion of wrist straps of an electronic device when cover 600 is placed on the electronic device. Similar to cover 100 of FIGS. 1A and 1B, cover 600 may include display window 620, deformable raised protrusion 630 and rear aperture 640a. In some other examples, ends 602a, 602b may extend farther, so as to cover larger portions of wrist straps when cover 600 is placed over the electronic device. Where ends 602a, 602b cover portions of the wrist straps, cover 600 may also prevent damage or stress at joints between the wrist strap and the main portion of the wrist-worn device.

Figure 7:
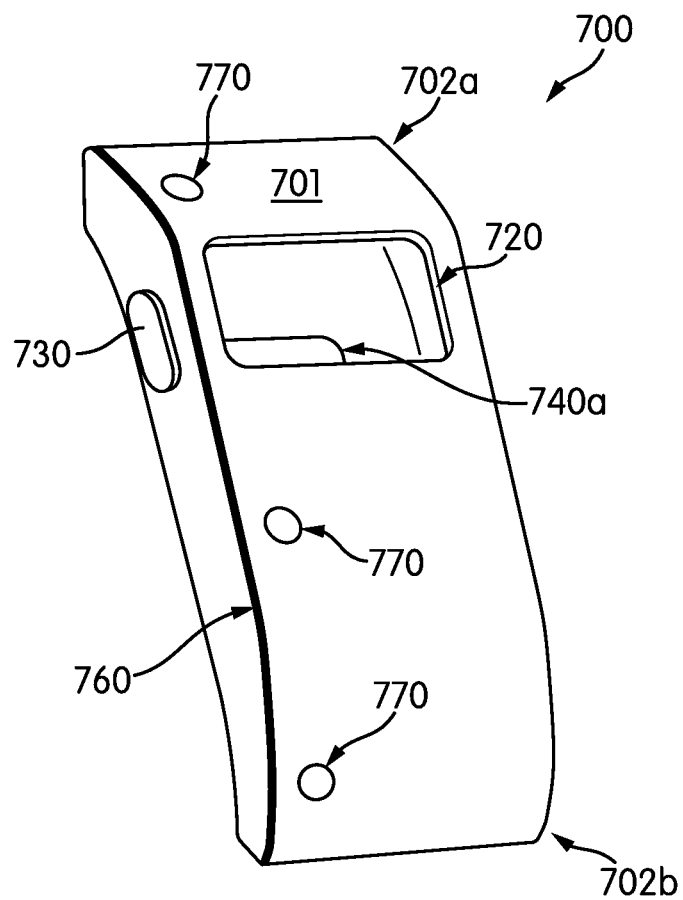
FIG. 7 is a perspective front view of a cover in accordance with one or more aspects of the present disclosure.

In certain embodiments, rather than stretching a cover over an electronic device, a cover may include one or more closure elements for attaching the cover to the electronic device. As shown in FIG. 7, cover 700 includes an openable seam 760 and closure elements 770 along seam 760 which are configured to removably attach cover 700 on an electronic device. Again, similar to cover 100 of FIGS. 1A and 1B, cover 700 may include housing 701 with opposing ends 702a, 702b, display window 720, deformable raised protrusion 730 and rear aperture 740a. Closure elements 770 may include snap fasteners, clasps, buttons, zippers, or other similar closure features. While FIG. 7 illustrates three closure elements 770, a cover may include a single closure element, two closure elements, or more than three closure elements without departing from the scope of the present disclosure.

Figure 8A:
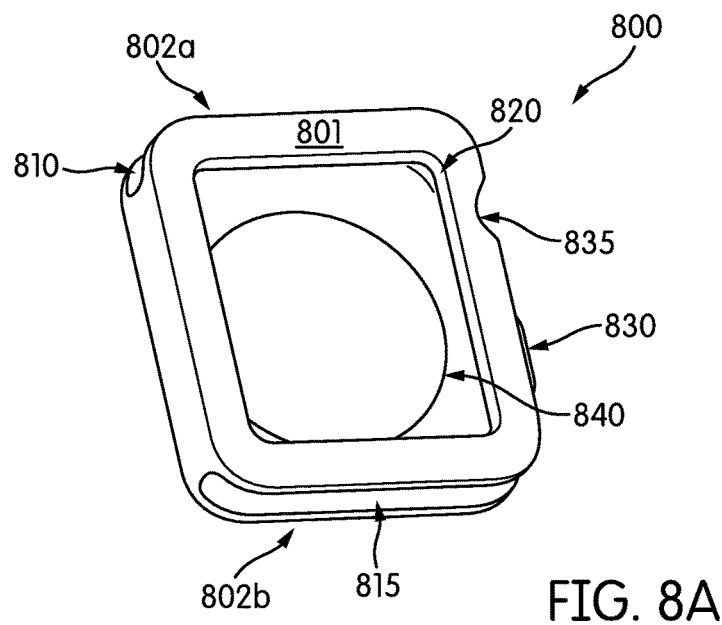
FIG. 8A is a perspective front view of a cover in accordance with one or more aspects of the present disclosure.
Figure 8B:
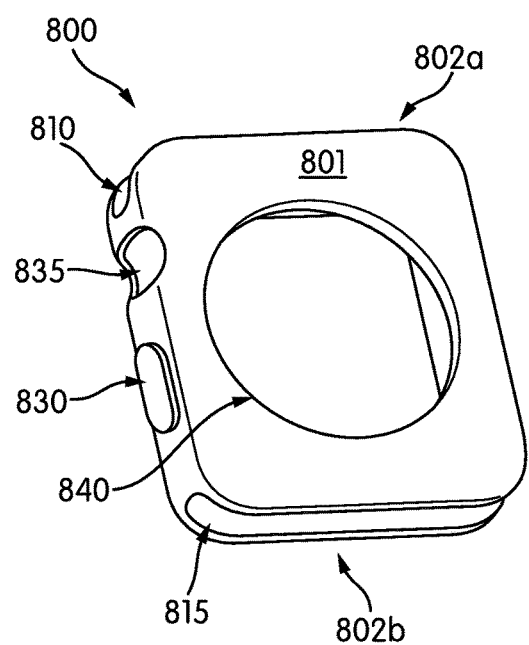
FIG. 8B is a perspective rear view of the cover of FIG. 8A.

Device covers according to aspects of the present disclosure may vary in sizes and/or have various features which vary in size so as to accommodate different electronic devices. For example, device cover 800 shown in FIGS. 8A and 8B may be sized and shaped so as to fit a particular device different than the device associated with device cover 100 of FIGS. 1A and 1B. Similar to device cover 100 of FIGS. 1A and 1B, device cover 800 of FIGS. 8A and 8B may include a main body or housing 801 having a first end 802a and a second end 802b opposite of the first end 802a. In some examples, a first wrist strap aperture 810 may be disposed at the first end 802a of housing 801 and a second wrist strap aperture 815 may be disposed at the second end 802b of housing 801. In some examples, instead of first and second wrist strap apertures 810, 815, the first end 802a and second end 802b may each include an attachment member (not shown) for attaching a wrist strap thereto. Display aperture 820 may be provided along one or more surfaces, e.g., a front surface, of housing 801 and may be sized and positioned corresponding to a display and/or to allow visibility of the display of an associated device. Rear aperture 840 may be provided along one or more surfaces, e.g., a rear surface, of housing 801 and may be sized and positioned corresponding to, and/or to allow accessibility to, at least one of a sensor or a charging port of an associated device. Device cover 800 may further include a deformable raised protrusion 830 and/or an opening 835 sized and positioned corresponding to a button or a dial of an associated device.

While the invention has been described with respect to specific examples including presently preferred modes of carrying out the invention, those skilled in the art will appreciate that there are numerous variations and permutations of the above described systems and techniques. For example, the embodiments depicted in the figures reflect illustrative industrial designs. However, there are numerous variations of industrial design that embody elements and combinations of elements of the disclosure. Thus, the spirit and scope of the invention should be construed broadly as set forth in the appended claims.

We claim:

1. A cover for a wrist-worn electronic device comprising:
a housing comprised of an elastic material and defining a cavity configured to receive at least a portion of the electronic device, the housing having a first end and a second end opposite of the first end;
a first wrist strap aperture and a second wrist strap aperture disposed at the respective first and second ends of the housing, the first wrist strap aperture and the second wrist strap aperture each configured to receive a wrist strap of the electronic device, wherein at least one of the first wrist strap aperture and the second wrist strap aperture is configured to receive and stretch over the least a portion of the electronic device; and
a display window disposed on a side of the housing between the first and second ends and configured to allow visibility of a display of the electronic device when the cover is placed on the electronic device.

2. The cover of claim 1, further comprising a deformable raised protrusion configured to cover a button of the electronic device and, responsive to a user push action, to elastically deform such that the button is pressed when the cover is placed on the electronic device.

3. The cover of claim 1, further comprising a first rear aperture disposed on a side of the housing opposite of the display window, the first rear aperture enclosed on all sides by the housing and being configured to allow accessibility to at least one of a sensor or a charging port of the electronic device when the cover is placed on the electronic device.

4. The cover of claim 3, further comprising a second rear aperture disposed adjacent to the first rear aperture, the first rear aperture being configured to allow accessibility to a charging port of the electronic device and the second rear aperture being configured to allow accessibility to a sensor of the electronic device when the cover is placed on the electronic device.

5. The cover of claim 3, wherein a side of the housing on which the display window is disposed has a first thickness and a side of the housing on which the first rear aperture is disposed has a second thickness that is less than the first thickness.

6. The cover of claim 1, wherein the housing comprises at least one of: silicone, plastic and rubber.

7. The cover of claim 1, wherein the housing is configured to cover at least a portion of the wrist strap when the cover is placed on the electronic device.

8. The cover of claim 1, wherein the housing is comprised of a stretchable material and is configured to fit flush with one or more surfaces of the electronic device.

9. The cover of claim 1, further comprising a closure element configured to removably attach the cover to the electronic device.

10. A wrist-worn device cover comprising:
a main body comprising an elastic material and including a plurality of sides defining a cavity therein;
a pair of end apertures disposed at opposing longitudinal ends of the main body, each end aperture of the pair of end apertures being positioned along at least one of the plurality of sides of the main body;
a first window enclosed on all sides and disposed on at least one of the plurality of sides of the main body; and
a second window enclosed on all sides and disposed at least one of the plurality of sides of the main body opposite the first window,
wherein a width of the cavity is defined by sides of the main body connecting sides on which the first and second windows are disposed, and a width of the cavity proximate to at least one of the pair of apertures in less than a width of the cavity proximate to the first and second windows.

11. The wrist-worn device cover of claim 10, further comprising visual elements on an exterior of the main body to assist in alignment of the cover with a wrist-worn device.

12. The wrist-worn device cover of claim 11, wherein the visual elements on the exterior of the main body include at least one of: one of surface ornamentation, a contrast of colors, and a contrast of surface finishes.

13. The wrist-worn device cover of claim 11, wherein the visual elements are located on a same side of the main body as the first window.

14. The wrist-worn device cover of claim 10,
wherein the main body is shaped so as to fit over a portion of a wrist-worn device,
wherein each of the pair of end apertures is configured to receive a wrist strap of the wrist-worn device and to receive and stretch over the least a portion of the wrist-worn device,
wherein the first window is configured to substantially align with a display portion of the wrist-worn device, and
wherein the second window is configured to substantially align with a sensor of the wrist-worn device.

15. The wrist-worn device cover of claim 10, wherein the main body is comprised of a stretchable silicone material and is configured to fit flush with one or more surfaces of a wrist-worn device.

16. A wrist-worn electronic device and device cover assembly comprising:
a wrist-worn electronic device comprising a pair of wrist straps and a main body having a display portion; and
an elastic protective device cover configured to cover the electronic device and shaped so as to stretch over at least a portion of the electronic device, the device cover including:
a first wrist strap aperture and a second wrist strap aperture disposed at opposing ends of the device cover and configured to receive the pair of wrist straps of the electronic device; and
a display window disposed on a side of the device cover between the first and second wrist strap apertures.

17. The wrist-worn electronic device and device cover assembly of claim 16, wherein the electronic device is an athletic activity monitoring device.

18. The wrist-worn electronic device and device cover assembly of claim 16, wherein the electronic device includes a sensor configured to contact a portion of a wearer's wrist and wherein the device cover includes a sensor aperture enclosed on all sides and configured to allow accessibility to the sensor when the device cover is placed on the electronic device.

19. The wrist-worn electronic device and device cover assembly of claim 16, wherein the electronic device includes a button and the device cover includes a deformable raised protrusion configured to cover the button and, responsive to a user push action, to elastically deform such that the button is pressed when the device cover is placed on the electronic device.

20. The wrist-worn electronic device and device cover assembly of claim 16, wherein the electronic device includes a charging portion and the device cover further includes a charging portion aperture configured to allow accessibility to the charging portion when the device cover is placed on the electronic device.

* * * * *